June 4, 1940.  A. L. PARKER  2,202,961
VALVE ASSEMBLY
Filed Dec. 7, 1937
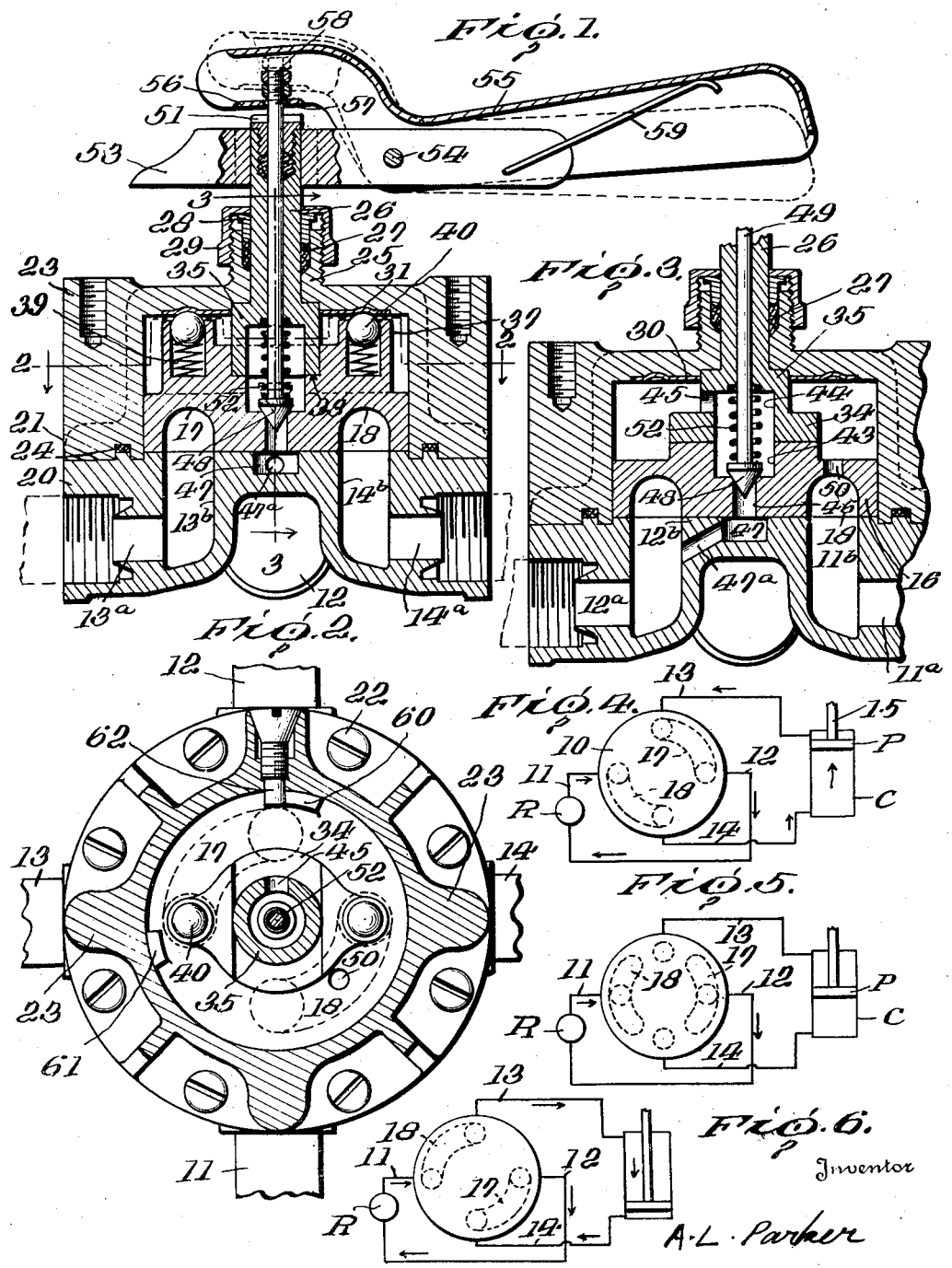

Patented June 4, 1940

2,202,961

UNITED STATES PATENT OFFICE 2,202,961

VALVE ASSEMBLY

Arthur L. Parker, Cleveland, Ohio

Application December 7, 1937, Serial No. 178,572

16 Claims. (Cl. 121—46.5)

The present invention relates to new and useful improvements in a valve assembly, and more particularly to improvements in a valve assembly for controlling the flow of fluid under pressure.

In the co-pending application of Arthur L. Parker, Ser. No. 162,207, filed September 2, 1937, there is shown and described a valve assembly of this general type, that is, a valve assembly for controlling the flow of fluid under pressure. In a valve assembly of this type, the pressure of the fluid is utilized to exert a seating pressure on the valve so as to assist in maintaining the valve tightly seated. The pressure of the fluid may be relieved to facilitate shifting of the valve to various positions. The present invention is directed to certain improvements in a valve assembly of this general type.

An object of the present invention is to provide a valve assembly wherein the pressure of the fluid is utilized to exert on the valve a seating pressure which may be relieved to facilitate shifting of the valve when the valve is in any position without manipulation of the valve stem.

A further object of the invention is to provide a valve assembly of the above type, wherein the fluid pressure tending to seat the valve may be relieved and bypassed from the high to the low pressure side of the fluid system when the valve is in any position without manipulation of the valve operating stem.

A still further object of the invention is to provide a valve assembly of the above type, wherein the fluid pressure tending to seat the valve may be relieved and bypassed by a valve mechanism which is associated with the valve operating stem, but which is operable entirely independently thereof.

The above and other objects of the invention will in part be obvious and will be hereinafter more fully pointed out.

In the accompanying drawing,

Figure 1 is a side view, in section, of the valve assembly.

Figure 2 is a sectional view of the valve assembly taken substantially along the line 2—2 of Figure 1.

Figure 3 is a fragmentary side view, in section, taken substantially along the line 3—3 of Figure 1.

Figures 4, 5 and 6 are diagrammatic views showing various positions of the valve.

The present invention is particularly concerned with a valve assembly for controlling a reciprocating piston or the like, which is adapted to operate a remotely situated mechanism, as for instance, the steering or leveling devices on airplanes, but it is to be clearly understood that the invention is not limited to such uses and is equally well adapted for use in various other instances. The valve assembly is employed in a closed fluid pressure system wherein the fluid is maintained under pressure by a rotary pump or the like. The valve assembly operates to direct the fluid under pressure to either or both sides of a cylinder within which the reciprocating piston is mounted so that movement of the piston in either direction may be accurately controlled.

Referring more in detail to the accompanying drawing, and particularly to Figures 4, 5 and 6, there are shown diagrammatic views of the closed fluid pressure system. The valve casing 10 is in communication with an inlet supply conduit 11 which is connected to the outlet or high pressure side of a rotary pump R. The valve casing is also in communication with an exhaust or return conduit 12 at a substantially diametrically opposed point thereon. Between the inlet and exhaust conduits 11, 12, the casing is in communication with intermediate diametrically opposed conduits 13, 14 which lead from the valve casing to opposite ends of a cylinder C within which a piston P is mounted for reciprocation. The piston rod 15 may be connected in any suitable manner to the remotely situated mechanism which is to be operated thereby.

A valve member 16, in the form of a disc, is mounted for rotary movement within the valve casing 10 and is adapted to selectively control the passage of fluid under pressure from the pump. The valve member 16 is provided with opposed arcuate channels 17, 18 which are adapted, in certain positions of the valve, to connect pairs of the conduits 11, 12, 13, 14. As shown in Figure 4, the valve member is in a position wherein the channel 17 affords communication between the inlet conduit 11 and the conduit 14 so that fluid under pressure from the pump is directed through the channel 17 and the conduit 14 to one end of the cylinder C so that the piston P is urged in the direction of the arrow. Fluid at the opposite side of the piston P is returned through the conduit 13, the channel 18 in the valve and the exhaust conduit 12 to the low pressure side of the pump. As shown in Figure 6, the valve member has been shifted so that the channel 17 affords communication from the supply conduit 11 to the conduit 13 and thence to the opposite end of the cylinder so that the piston will be moved in the opposite direction. During the movement of the piston in this direction, fluid at the opposite end of the cylinder will be forced through the conduit 14, the channel 18 and the exhaust conduit 12 back to the low pressure side of the pump. Thus, by manipulation of the valve member 16, the direction of movement of the piston may be determined at will. As shown in Figure 5, the valve member has been shifted to an intermediate position wherein the channels 17, 18 in the valve member are disposed so that the conduits 13, 14 are closed. In this position of the valve member, provision is made for the bypassing of fluid under pressure directly from the supply conduit 11 to the exhaust conduit 12 so that the piston may be maintained in any position to which it has been previously shifted. Thus, the piston may be moved through small increments of its full stroke, stopped and caused to remain in any desired position.

For purpose of illustration, one form of valve assembly is shown in Figures 1, 2 and 3 of the accompanying drawing. The valve casing 10 includes a body portion 20 and a cap or housing 21 which is secured to the body portion by screws 22 or the like. The cap 21 is provided with bosses 23 which are internally threaded so that the entire assembly can be secured to a suitable support. The body portion 20 is provided with diametrically opposed ports 11a, 12a, 13a, 14a, which are in communication with the conduits 11, 12, 13, 14 respectively, and with vertical passages 11b, 12b, 13b, 14b respectively, in the body portion 20. The vertical passages extend upwardly and open in the face of the body portion. A sealing gasket 24 is disposed between the cap 21 and the body portion 20 so as to prevent leakage of fluid.

The cap 21 is provided with an upstanding reduced cylindrical portion 25 through which a valve operating stem 26 extends. A fluid seal is provided around the valve stem 26 by a packing 27 and a follower 28 which is maintained in position by a locking cap 29 threadedly engaging the cylindrical portion 25. An annular plate 30 is secured to the inner face of the top wall of the cap or housing 21 and is provided with spaced recesses 31, the purpose of which will be hereinafter pointed out.

The valve member 16 is mounted in the valve casing within the cap 21 and in contact with the upper face of the body portion 20. The valve member is provided with a rectangular or other non-circular recess 33 which is adapted to receive the lower end 34 of the valve stem 26. The lower end 34 of the valve stem is rectangular in shape and snugly fits within the recess 33 so as to form a key connection by means of which the valve member 16 may be turned upon rotation of the valve stem 26. Immediately above the lower end 34, the valve stem is provided with an enlarged cylindrical portion 35 disposed within the cap 21 and abutting against a portion of the upper face thereof. The valve member 16 is provided with opposed vertical projections 37 which are internally bored to provide recesses. The vertical projections are spaced on the valve member symmetrically with respect to the recesses 31 in the annular plate 30. Coil springs 39 are disposed in the recesses formed in the projections 37 and operate against balls 40 to normally urge the same upwardly. Thus, the balls 40 cooperate with the recesses 31 in the annular plate 30 to properly locate the valve member in predetermined positions.

The valve member 16 is provided with a central recess 43 in the upper face thereof, and this recess communicates with a similar recess 44 in the adjacent lower portion of the valve stem. Thus, the recesses 43 and 44 communicate with one another and afford a chamber. This chamber is in communication with the space above the valve member and within the cap 21 through a port 45 in the cylindrical portion 35 of the valve stem. The valve member 16 is provided with a vertical port 46 which extends from the recess 43 to a recess 47 in the body portion 20 of the valve assembly. The body portion 20 is provided with an inclined port 47a which provides communication between the recess 47 and the vertical passage 12b so that the port 46 is thus in communication with the discharge conduit 12 of the fluid system. The valve member 16 is also provided with a port 50 which affords communication between the channel 18 and the space above the valve member. A valve 48 is disposed within valve member. A valve 48 is disposed within the recess 43 and is carried by an operating rod 49 which extends upwardly through the recesses 43, 44 and through the valve operating stem 26. A packing is placed around the operating rod 49 and a packing nut 51 is employed for compressing the packing to prevent leakage of fluid. A spring 52 surrounds the operating rod 49 within the chamber formed by the recesses 43 and 44. This spring abuts against the valve operating stem 26 and also against the valve 48 and thus tends to normally force the valve 48 downwardly for closing the port 46.

The arcuate channels 17, 18 in the valve member 16 open at the lower face thereof and are adapted to afford communication between different pairs of ports in the valve body 20, depending on the position to which the valve member is moved. The free end of the valve stem 26 carries an arm 53 on which is pivotally mounted, as at 54, a handle lever 55. One end of the handle lever 55 is disposed above the valve operating rod 49 and is providing with a horizontal flange portion 56 having a slot 57 through which the operating rod 49 extends. A nut 58 is secured to the upper end of the operating rod 49 above the flange 56.

A spring 59 is secured to the arm 53, and the free end of this spring bears against the opposite end of the handle lever 55 so as to normally urge the lever in a counterclockwise direction, that is, to the position shown in full lines in Figure 1. The slot 57 in the flange portion 56 permits pivotal movement of the handle lever 55 without bending or straining the valve operating rod 49. When the handle lever 55 is moved in a clockwise direction against the action of the spring 59, that is, to the position shown in dotted lines in Figure 1, the flange portion 56 will engage the nut 58 on the rod 49 and thus raise the valve 48 against the action of the spring 52 so as to open the port 46.

It is only necessary to shift the valve member through approximately 90° to reverse the direction of flow of fluid issuing from the pump R. To this end, the valve member is provided with upstanding lugs 60, 61 spaced approximately 90° apart and at the outer edge thereof. A stop pin 62 is suitably secured in the cap 21 of the valve casing and extends, as shown in Figure 2, into the path of movement of the lugs 60, 61. When the valve member 16 is in the extreme position shown in Figure 2 with the pin 62 abutting against the lug 60, the channel 18 in the valve member affords communication between the conduits 11 and 14, and the channel 17 affords communication between the conduits 12 and 13. This position of the valve member is diagrammatically illustrated in Figure 4, and in this position fluid under pressure is forced from the pump R through the conduit 11, the channel 18 and the conduit 14 to one end of the cylinder C so as to force the piston upwardly, as seen in Figure 4. Fluid on the opposite side of the piston is returned through the conduit 13, the channel 17 and conduit 12 to the low pressure side of the pump. The springs 52 and 59 both act to maintain the valve 48 seated so as to close the port 46. The port 50 in the valve member is in communication with the channel 18 which is at all times in communication with the inlet or supply conduit 11. Thus, fluid under pressure is forced by the pump R through the conduit 11 into the channel 18 and thence through the port 50 to the space above the valve member 16 so that, when the port 46 is closed, the pressure of the fluid above the valve member tends to exert a seating pressure thereon. The area of the top of the valve member 16 is greater than the surface area of the channel 18 so that the pressure exerted by the fluid against the top of the valve member is greater than the pressure exerted by the fluid against the surface of the channel 18. Thus, the pressure tending to lift the valve member from its seat is overcome by the pressure of the fluid against the top of the valve member so that it is maintained tightly seated. In this manner, fluid under pressure serves to maintain the valve member tightly seated and is prevented from leaking across the valve member into the low pressure side of the fluid pressure system.

When it is desired to shift the valve member 16, the handle lever 55 is depressed so that the operating rod 49 is raised by contact of the flange 56 with the nut 58. Thus, the valve 48 is elevated from its seat against the action of the spring 52 so as to open the port 46. When the port 46 is open, communication is afforded between the high and the low pressure sides of the fluid system since the fluid under pressure entering the space above the valve member through the port 50 may be bypassed through the port 45 in the valve stem 26, into the chamber defined by the recesses 43, 44, then through port 46 and finally through the port 47a to the discharge or exhaust conduit 12. The cross sectional area of the ports 45, 46, and 47a is greater than the cross sectional area of the port 50 so that the fluid under pressure is permitted to bypass faster than it can enter the space above the valve member. In this manner, pressure above the valve member is relieved so that the valve operating stem may be easily turned by manipulation of the handle lever 55. While the handle lever 55 is depressed and the valve 48 elevated from its seat, the bypassing of the fluid under pressure permits a balancing of pressure on opposite sides of the piston so that the piston will remain in the position to which it has been moved.

While the valve 48 is raised, the valve may be easily rotated to its opposite extreme position, that is, with the pin 62 abutting against the plug 61. This position of the valve member is illustrated diagrammatically in Figure 6 wherein the channel 18 affords communication between the conduits 11 and 13, and the channel 17 affords communication between the conduits 14 and 12. In this position of the valve member when the handle lever is released and the valve 48 seated to close the port 46, fluid under pressure is directed from the pump to the opposite end of the cylinder C so as to reverse the direction of movement of the piston. When it is again desired to shift the valve member, the handle lever 55 may be depressed to bypass fluid across the top of the valve member in the manner hereinbefore described.

The piston may be positively held in any intermediate position to which it has been shifted by turning the valve member to the position shown diagrammatically in Figure 5. In this position, the conduits 13, 14 which connect the opposite ends of the cylinder C are closed by the valve member since the channels 17 and 18 are not in communication with the vertical passages 13b, 14b. The channels 17, 18, in this position of the valve member, are only in communication with the supply and exhaust conduits 11, 12, and while the handle lever 55 is depressed, fluid will be bypassed directly across the top of the valve member from the supply conduit to the discharge conduit or, in other words, from the high to the low pressure side of the pump. It is obvious that, since the valve assembly is employed in closed fluid systems, the piston may be maintained in any position to which it has been moved.

It will be obvious from the foregoing description that the piston may be moved the entire length of its stroke by shifting the valve member 16 and the valve operating stem 26 from one extreme position to another and that small increments of movement in either direction can be imparted to the piston by proper manipulation of the valve operating stem. Shifting of the valve member is greatly facilitated by depressing the handle lever 55 so that the fluid under pressure tending to seat the valve member can be bypassed from the high to the low pressure side of the fluid system. The present invention thus affords a highly efficient valve mechanism for equally controlling the direction of flow of fluid under pressure.

It is to be clearly understood that minor changes in the construction and arrangement of parts may be made without departing from the scope of the invention as set forth in the appended claims.

I claim:

1. A valve assembly for controlling the flow of fluid under pressure, comprising a valve casing having a seat provided with a plurality of ports, a valve member mounted in said casing with one side thereof in contact with said seat and adapted to selectively control the passage of fluid through said ports, a stem extending into said casing for operating said valve member, means for directing fluid under pressure to the opposite side of said valve member to exert a seating pressure thereon, and means associated with said valve member and operable independently of said stem for bypassing the fluid under pressure through said valve member whereby to facilitate the shifting thereof.

2. A valve assembly for controlling the flow of fluid under pressure, comprising a valve casing having a seat provided with a plurality of ports, a valve member mounted in said casing with one side thereof in contact with said seat and adapted to selectively control the passage of fluid through said ports, means for directing fluid under pressure to the opposite side of said valve member to exert a seating pressure thereon, a valve stem for shifting said valve member, and means associated with said valve stem and with said valve member and operable independently of said stem and exteriorly of said casing for bypassing the fluid under pressure through said valve member whereby to facilitate the shifting thereof.

3. A valve assembly for controlling the flow of fluid under pressure, comprising a valve casing having a seat provided with a plurality of ports, a valve member mounted in said casing and adapted to selectively control the passage of fluid through said ports, a valve stem for shifting said valve member to different positions, means for directing fluid under pressure to a position with respect to said valve member for exerting a seating pressure thereon, and means disposed within said valve member and operable independently thereof for relieving the pressure tending to seat the said valve member whereby to facilitate the shifting thereof.

4. A valve assembly for controlling the flow of fluid under pressure, comprising a valve casing having a seat provided with a plurality of ports, a rotatable valve member mounted in said casing with one side thereof in contact with said seat and adapted to selectively control the passage of fluid through said ports, a stem for rotating said valve member, means for directing fluid under pressure against the opposite side of said valve member to exert a seating pressure thereof, and a bypass valve associated with said valve member and reciprocable independently of movement of said stem for bypassing the fluid under pressure through said valve member whereby to facilitate the shifting thereof.

5. A valve assembly for controlling the flow of fluid under pressure, comprising a valve casing having a seat provided with a plurality of ports, a rotatable valve member mounted in said casing with one side thereof in contact with said seat and adapted to selectively control the passage of fluid through said ports, means for directing fluid under pressure against the opposite side of said valve member to exert a seating pressure thereon, a valve stem extending into said casing and adapted to rotate said valve member, conduit means for bypassing the fluid under pressure through said valve member whereby to facilitate the shifting thereof, and valve means disposed within said valve member and operable independently of said valve stem and of said valve member for controlling the bypassing of the fluid through said conduit means.

6. A valve assembly for controlling the flow of fluid under pressure in a closed fluid pressure system, comprising a valve casing having a seat provided with a plurality of ports, a valve member mounted in said casing and adapted to selectively control the passage of fluid through said ports, a valve stem for shifting said valve member, means including a passage through said valve stem for bypassing fluid under pressure from the high to the low pressure side of the fluid system across the upper surface of said valve member, and means associated with said valve stem and operable independently thereof for closing the passage therethrough whereby the pressure of the fluid will exert a seating pressure on the valve member.

7. A valve assembly for controlling the flow of fluid under pressure in a closed fluid pressure system, comprising a valve casing having a seat provided with a plurality of ports, a valve member having one face thereof contacting with said seat and adapted to selectively control the passage of fluid through said ports, a valve stem for operating said valve member, means for directing fluid under pressure to the opposite face of said valve member whereby the fluid under pressure will exert a seating pressure on said valve member, conduit means through said valve stem and said valve member for bypassing fluid under pressure from the opposite face of said valve member whereby to relieve the seating pressure thereon and to facilitate shifting thereof, and valve means operable independently of said valve member and said valve stem for controlling the passage of fluid under pressure through said conduit means.

8. A valve assembly for controlling the flow of fluid under pressure in a closed fluid pressure system, comprising a valve casing having a seat comprising a plurality of ports, a valve disc mounted in said casing with one face thereof in contact with said seat and adapted to selectively control the passage of fluid through said ports, a valve stem for shifting said valve disc, said valve disc having a port therethrough in communication with the high pressure side of the fluid system for permitting the passage of fluid under pressure to the opposite face of said valve disc for exerting a seating pressure thereon, conduit means through said valve disc in communication with the low pressure side of the fluid system, a valve for closing said conduit means whereby the fluid under pressure will exert a seating pressure on the valve disc and means operable independently of said valve stem for opening said valve to permit fluid under pressure to pass through said conduit means whereby to facilitate shifting of said valve disc.

9. A valve assembly for controlling the flow of fluid under pressure, comprising a valve casing having a plurality of ports, a valve disc mounted in said casing with one face thereof adapted to selectively control the passage of fluid through said ports and with the opposite face thereof spaced from said casing, a valve stem for shifting said valve disc, means for directing fluid under pressure to the space between said valve disc and said casing whereby the fluid under pressure will exert a seating pressure on said valve disc, communicating recesses in said valve stem and said valve disc providing a chamber, said valve stem having a port communicating with said chamber and with the space above said valve disc, means providing a bypass conduit from said chamber through said valve disc for permitting the passage of fluid under pressure from the space above said valve disc, a valve disposed in said chamber and adapted to close said bypass conduit whereby the fluid under pressure will exert a seating pressure on said valve disc, and means operable independently of said valve stem for shifting said valve to open said bypass conduit whereby to relieve the seating pressure on said valve disc and to facilitate the shifting thereof.

10. A valve assembly for controlling the flow of fluid under pressure, comprising a valve casing having a seat provided with a plurality of ports, a valve member mounted in said casing with one face thereof in contact with said seat for selectively controlling the passage of fluid through said ports and with the opposite face thereof spaced from said casing, the said opposite face of said valve member having a non-circular recess therein, a valve operating stem having a similarly shaped non-circular lower end portion snugly fitting within said recess whereby rotation of said valve stem will effect corresponding rotation of said valve member, means for directing fluid under pressure to the opposite face of said valve member, whereby the fluid under pressure will exert a seating pressure on said valve member, means providing a bypass conduit through said valve stem and said valve member for permitting bypassing of the fluid to relieve the seating pressure on said valve member, and valve means operable externally of said valve casing and independently of said valve stem for opening and closing said bypass conduit.

11. A valve assembly for controlling the flow of fluid under pressure, comprising a valve casing having a plurality of ports, a valve disc mounted in said casing with one face thereof adapted to selectively control the passage of fluid through said ports and with the opposite face thereof spaced from said casing, a valve stem for shifting said valve disc, means for directing fluid under pressure to the space between said valve disc and said casing whereby the fluid under pressure will exert a seating pressure on said valve disc, communicating recesses in said valve stem and said valve disc providing a chamber, said valve stem having a port communicating with said chamber and with the space above said valve disc, means providing a bypass conduit from said chamber through said valve disc for permitting the passage of fluid under pressure from the space above said valve disc, a valve disposed in said chamber and adapted to close said bypass conduit whereby the fluid under pressure will exert a seating pressure on said valve disc, spring means for normally urging said valve to a position for closing said bypass conduit, and means operable independently of said valve stem for shifting said valve to open said bypass conduit whereby to relieve the seating pressure on said valve disc and to facilitate the shifting thereof.

12. A valve assembly for controlling the flow of fluid under pressure, comprising a valve casing having a seat provided with a plurality of ports, a valve disc mounted in said casing with one face thereof in contact with said seat for selectively controlling the passage of fluid through said ports and with the opposite face thereof spaced from said casing, a valve operating stem for shifting said valve disc, means for directing fluid under pressure to the opposite face of said valve disc whereby the pressure of the fluid will exert a seating pressure on said valve disc, means providing a bypass through said valve disc for permitting bypassing of the fluid to relieve the seating pressure on said valve disc, a valve for controlling said bypass, a valve operating rod extending from said valve externally of said casing, and means connected to said valve operating rod externally of said casing and operating independently of said valve stem for shifting said valve whereby to control the passage of fluid through said bypass.

13. A valve assembly for controlling the flow of fluid under pressure, comprising a valve casing having a seat provided with a plurality of ports, a valve member mounted in said casing with one face thereof in contact with said seat for selectively controlling the passage of fluid through said ports and with the opposite face thereof spaced from said casing, a valve operating stem connected to said valve member and having a central bore therethrough, means for directing fluid under pressure to the opposite face of said valve member, means providing a conduit through said valve member for permitting bypassing of the fluid under pressure, a valve for closing said conduit whereby the pressure of the fluid will exert a seating pressure on said valve member, a rod connected to said valve and extending through the bore in said valve stem to a point outside of said casing, and handle means for rotating said valve stem and having associated therewith means connected with said rod for shifting said valve to open said conduit whereby to permit bypassing of the fluid under pressure to facilitate shifting of said valve member.

14. A valve assembly for controlling the flow of fluid under pressure, comprising a valve casing having a seat provided with a plurality of ports, a valve member mounted in said casing with one face thereof in contact with said seat for selectively controlling the passage of fluid through said ports and with the opposite face thereof spaced from said casing, a valve operating stem connected to said valve member and having a central bore therethrough, means for directing fluid under pressure to the opposite face of said valve member, means providing a conduit through said valve member for permitting bypassing of the fluid under pressure, a valve for closing said conduit whereby the pressure of the fluid will exert a seating pressure on said valve member, a rod connected to said valve and extending through the bore in said valve stem to a point outside of said casing, an arm connected to said valve stem, and a handle lever pivotally mounted on said arm and connected to said rod for shifting the rod and the valve connected thereto for opening said conduit whereby to bypass fluid under pressure and to facilitate shifting of said valve member.

15. A valve assembly for controlling the flow of fluid under pressure, comprising a valve casing having a seat provided with a plurality of ports, a rotatable valve member mounted in said casing with one side thereof in contact with said seat and adapted to selectively control the passage of fluid through said ports, a stem for rotating said valve member, means for directing fluid under pressure to the opposite side of said valve member to exert a seating pressure thereon, and means rotatable with said valve member and manually reciprocable independently of said stem for bypassing the fluid under pressure tending to seat said valve member whereby to facilitate the shifting thereof.

16. A valve assembly for controlling the flow of fluid under pressure, comprising a valve casing having a seat provided with a plurality of ports, a rotatable valve member mounted in said casing with one side thereof in contact with said seat and adapted to selectively control the passage of fluid through said ports, means for directing fluid under pressure to the opposite side of said valve member to exert a seating pressure thereon, valve means within said casing and reciprocable independently of said valve member for bypassing the fluid under pressure tending to seat said valve member whereby to facilitate the shifting thereof, and means rotatable with said valve member for reciprocating said valve means in order to control the bypassing of the fluid.

ARTHUR L. PARKER.